May 26, 1970 W. C. PRITCHETT ET AL 3,514,750

BOREHOLE TELEMETERING SYSTEM

Filed June 24, 1968 2 Sheets-Sheet 1

INVENTORS
William C. Pritchett
Ray L. Calkins
BY
Blucher S. Tharp
Attorney

BOREHOLE TELEMETERING SYSTEM

Filed June 24, 1968 2 Sheets-Sheet 2

INVENTORS
William C. Pritchett
Ray L. Calkins
BY
Blucher S. Tharp
Attorney

United States Patent Office 3,514,750
Patented May 26, 1970

3,514,750
BOREHOLE TELEMETERING SYSTEM

William C. Pritchett, Dallas, and Ray L. Calkins, Richardson, Tex., assignors to Atlantic Richfield Company, Philadelphia, Pa., a corporation of Pennsylvania Continuation-in-part of application Ser. No. 631,316, Apr. 17, 1967. This application June 24, 1968, Ser. No. 743,267
Int. Cl. G01v *1/40, 1/22*
U.S. Cl. 340—18 5 Claims

ABSTRACT OF THE DISCLOSURE

A telemetering process for transmitting information over a multiconductor borehole cable to the surface under conditions whereby cross-talk is minimized. Logging data is transposed into digital signals. Signals which have the same significance are combined to simplify telemetry. Pairs of less than all of the telemetric conductors are selected such that their individual members are symmetrical with respect to each of the remaining unpaired conductors. Signals to be sent uphole are encoded by applying an equal number of positive and negative pulses of equal duration to separate members of one or more of the pairs of conductors. The code pulses are synchronously transmitted to the surface where they are decoded to reproduce the digital signals.

Cross-reference to related application

This application is a continuation-in-part of application Ser. No. 631,316, filed Apr. 17, 1967, now abandoned.

Background of the invention

The invention pertains to well logging and particularly relates to telemetering processes for transmitting information to the surface.

Modern logging tools are capable of producing great quantities of information characterizing subsurface formations. This information must in some way be communicated or telemetered to the surface so that it may be utilized in locating underground oil deposits, etc.

Usually data of interest is digitized downhole to eliminate the effects of cable transmission variables caused by changes in temperature, tension, etc. Even then, telemetry is no simple matter since the number of signals to be transmitted usually exceeds the number of telemetric conductors, i.e. communication channels.

Moreover, cross-talk commonly takes place during the telemetering process, severely limiting the reliability of the transmitted data; this poses a most serious problem in that the received information becomes subject to erroneous interpretation.

Past attempts to eliminate cross-talk generally have been based on the concept of avoiding simultaneous transmission of signals. This approach, while a step in the right direction, only lessens the adverseness of the problem and does not solve it. Even when only one signal is transmitted, cross-talk still occurs to some extent between the active conductors, i.e. pulse-carrying conductors, on the one hand, and the vacant or unused telemetric conductors, on the other. Crosstalk between the former and the latter can result in pseudo pulses which may be confused with pulses representing signals—causing false interpretation of the transmitted code.

Accordingly, there is a need for an improved telemetering system whereby digitized signals can be transmitted uphole in a manner such that cross-talk is avoided or reduced to such a level that it may safely be ignored. Obviously, the more signals a telemetering system can handle, the greater its usefulness so that a process is desired whereby cross-talk is minimized while at the same time provision is made for encoding a relatively large number of signals.

Summary of the invention

The present invention provides a novel process for encoding and transmitting a large number of digital signals up a borehole under conditions whereby cross-talk is minimized.

Information obtained during logging operations is converted into digital signals for transmission purposes. Preferably digital signals which have the same significance, i.e. the same geological meaning, are combined downhole to reduce the number of individual signals which must be encoded on the borehole cable. This greatly simplifies the telemetering process and is especially advantageous where the signals are to be encoded on a limited number of channels.

Pairs of less than all of the available telemetric conductors are selected for use such that the individual members of each of the pairs are symmetrical with respect to each of the remaining unpaired telemetric conductors. Digital signals are then encoded according to a predetermined program whereby positive and negative pulses of equal duration (width) are applied to separate members, respectively, of one or more of the selected pairs of conductors. Hence, each code consists of an equal number of positive and negative pulses applied to select pairs of spatially arranged conductors. The code pulses for each signal are in turn synchronously transmitted or carried over one or more of the conductor-pairs to the surface where they are decoded in accordance with the stated program to reproduce the digital signals.

Since each conductor-pair is symmetrical with respect to each of the unused telemetric conductors, it follows that each of the member conductors, when energized, produces forces which have the same magnitude of inductive and capacitive effects on the vacant conductors. By synchronously sending pulses of equal duration and opposite polarities over the conductors comprising each of the conductor-pairs, these forces can be made to act in opposite directions, i.e. cancel, with the result that cross-talk on the unused conductors is eliminated. (Residual inductive and/or capacitive interactions between the used or pulse-carrying conductors, to whatever extent they occur, are generally inconsequential.)

In order to practice the invention at least three telemetric conductors must be available for use so that (1) the minimum requirement of one conductor-pair is fulfilled and (2) there remains at least one unused conductor. By "telemetric" is meant only those conductors which are used as communication channels for carrying information to the surface. Thus, conductors which are used exclusively for purposes other than telemetering such as providing power, controlling downhole operations, etc., are excluded and without the processes of the invention.

The invention has wide application and can successfully and advantageously be employed in any type of logging system such as radioactive logging (e.g. chlorine logging), sonic logging, electrical logging, etc. The invention can also be utilized wherever a reliable borehole telemetry system is required outside the realm of well logging.

Description of the preferred embodiments

Figure 1:
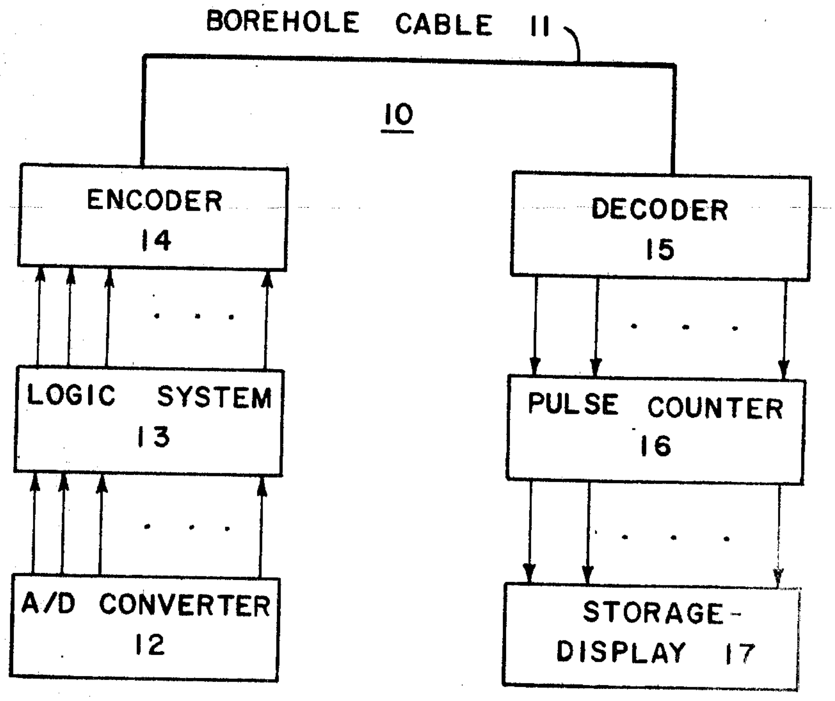
FIG. 1 is a block diagram showing the basic downhole and uphole telemetering components for a generalized well logging system.

In order to place the invention in proper perspective reference is made to FIG. 1. Well logging system 10 has multiconductor cable 11 connecting downhole components which include analog-to-digital converter 12, logic system 13, and encoder 14 to uphole components including decoder 15, pulse counter 16, and storage-display 17.

Logging data is digitized by analog-to-digital (A/D) converter 12 such that pertinent data is represented according to particular subcomponents that are energized. Converter 12 actually performs dual functions of analyzing the input analog signals and producing output digital signals for the areas of interest. The type of A/D converter preferred by applicants is discussed in U.S. Pats. 3,264,475 and 3,368,075 and in copending applications Ser. No. 549,945 and 549,946. In brief, analog signals representing various subsurface parameters are fed to a plurality of parallel discriminators where they are characterized according to their pulse height. Each discriminator consists of one or more differential amplifiers (e.g. Motorola integrated circuits MC1526 and MC1527) and a flip-flop (e.g. Motorola integrated circuit MC352). The discriminators are arranged in pairs so that they define predetermined energy intervals or windows which are used to classify the input signals. Input signals of sufficient energy are passed by the amplifiers and activate the flip-flops causing them to change from one energy level to another.

Logic system 13 typically includes one or more logic circuits such as AND and OR circuits. The AND circuits are used for gating purposes, i.e. to synchronize the output pulses with clock (timing) pulses. The OR circuits are adapted to combine or total certain preselected digital signals in order to simplify subsequent telemetry operations. Reference is made to copending applications Ser. No. 549,945 and 549,946 for examples where OR circuits are used to combine chlorine and calcium signals obtained by scanning several different energy intervals characteristic of each element. (Motorola integrated circuit MC356 can be used as either an AND or an OR circuit as required in building the overall logic system.)

Encoder 14 codes digital signals of interest according to a predetermined program whereby electrical pulses of equal duration are applied to individual telemetric conductors of borehole cable 11. Each code or transmission consists of an equal number of positive and negative pulses applied to select pairs of the telemetric conductors. Physically, encoder 14 is a switching system composed of translating circuits interconnecting logic system 13 and the telemetric conductors. The translating circuits transpose the input digital signals into the same information expressed in the transmission code.

Figure 4:
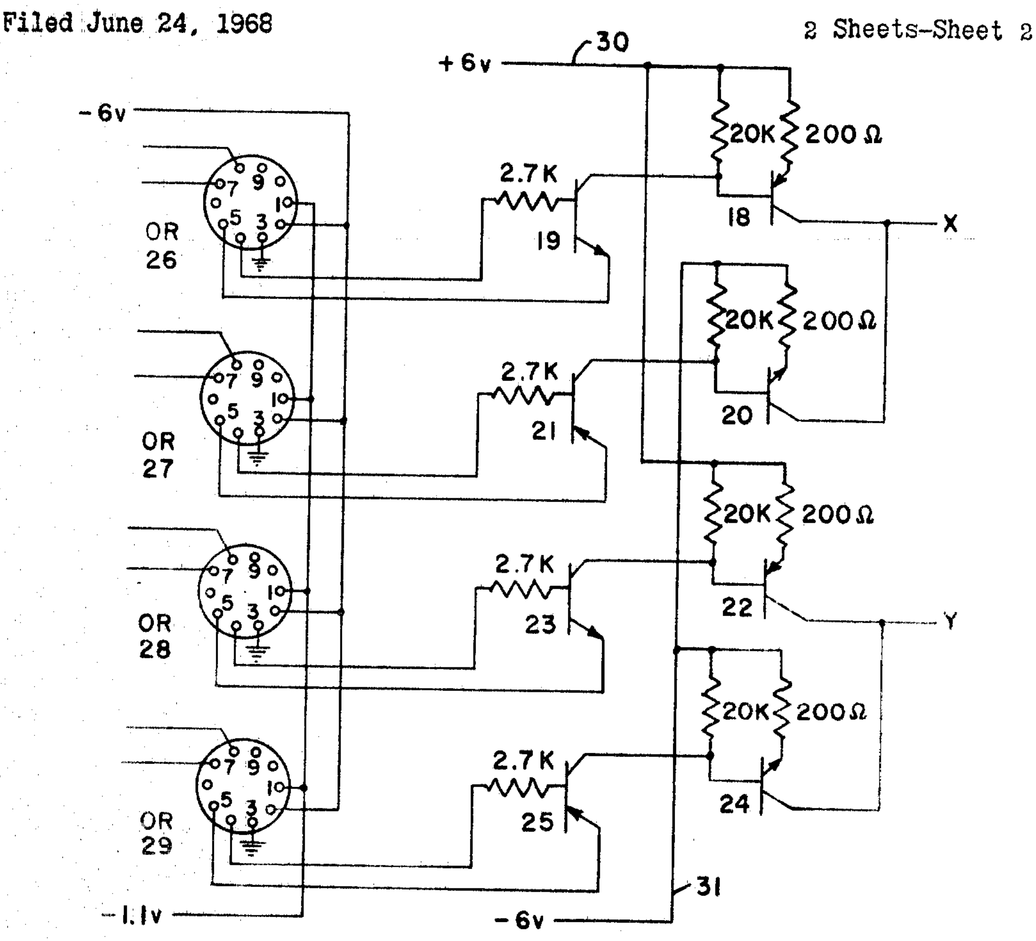
FIG. 4 is a circuit diagram of the encoder.

This is seen more clearly in FIG. 4. Lines X and Y represent any two conductors that carry pulses up cable 11 (FIG. 1) to the surface. Lines X and Y are connected to transistors 18, 19, 20, 21, 22, 23, 24, and 25 which act as switches to connect lines X and Y to positive or negative voltage sources, depending on the logic conditions of OR circuits 26, 27, 28, and 29. (Motorola integrated circuit MC356 is used for the OR circuits.)

A typical operation can be described by considering the circuits connected to line X. If there is an input signal to OR circuit 26 at either of pins 7 or 8, the normal voltage outputs at pins 4 and 5 are reversed, causing transistor 19 to conduct. The collector current of transistor 19 develops a voltage drop across the 20K resistor in the base circuit of transistor 18, causing transistor 18 to conduct. Thus, line X is connected to line 30 through a low impedance and is given a positive pulse. If there is an input signal to OR circuit 27 at either of pins 7 or 8, transistors 21 and 20 are turned on so that line X is connected to line 31 through a low impedance and is given a negative pulse. If neither of OR circuits 26 or 27 has an input at pins 7 and 8, the output voltages at pins 4 and 5 are such that transistors 19 and 21 are biased to be nonconducting and no voltage pulse is applied to line X. Code pulses for each signal are synchronously transmitted over the telemetric conductors of cable 11, FIG. 1, to the surface where decoder 15 acts to reproduce the encoded signals. Decoder 15 is comprised of a plurality of inverters and AND circuits associated with all combinations of the telemetric conductors such that each group of received code signals will activate a particular AND circuit. Hence, decoder 15 reverses the coding transformation accomplished by encoder 14 so that all the counterpart signals of the transmission code are in effect recombined.

Figure 5:
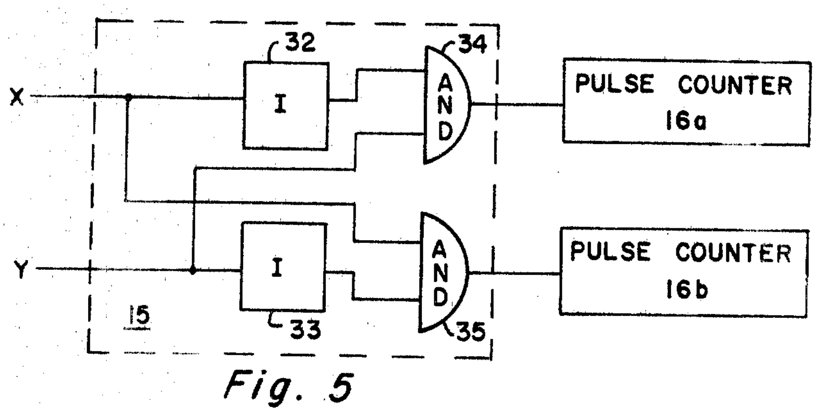
FIG. 5 is a circuit diagram of the decoder.

Reference is made to FIG. 5. Conductors X and Y lead uphole to phase inverters 32 and 33 and AND circuits 34 and 35. Assume that a negative pulse is carried by line X and that line Y has a positive pulse. Inverter 32 changes the negative pulse on line X to a positive pulse so that two positive pulses are applied to the inputs of AND circuit 34. At the same time, inverter 33 causes the polarity of the positive pulse on line Y to change so that two negative pulses are applied at the inputs of AND circuit 35. The AND circuits are designed to operate only when the input pulses are negative. Accordingly, an output pulse is produced by AND circuit 35, but not by AND circuit 34. On the other hand, if a positive pulse is applied to line X and a negative pulse to line Y, operations are reversed with the result that an output pulse is produced by AND circuit 34.

Pulse counter 16, FIG. 1, registers each digital signal and totalizes signals which are the same over a predetermined period of time. This is shown more clearly in FIG. 5 where the outputs of AND circuits 34 and 35 connect to pulse counters **16*a* and 16*b*, respectively. Thus, counter 16*a* registers all pulses produced by AND circuit 34 and counter 16*b* does the same for all the pulses produced by AND circuit 35**. Examples of pulse counters which may be used are Anadex Instruments "Model CF200" and Hewlett Packard "Model 5245L."

Storage-display 17, FIG. 1, separately records the totaled digital signals for future processing, performs digital-to-analog conversion, etc. Digital tape recorders such as Kennedy Model 1400IR can be used for storage while standard strip short recorders such as Brush Recorder Mark 200 can be used for display.

Figure 2:
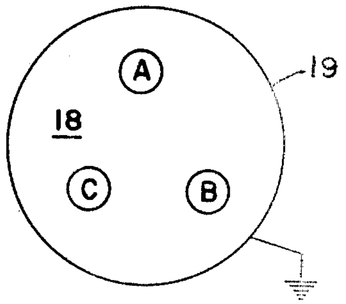
FIG. 2 is a cross-sectional representation of a three-conductor borehole cable.

Reference is now made to FIG. 2 which shows three-conductor logging cable 18 having grounded armored sheath 19. Conductors A, B, and C are telemetric conductors positioned respectively at the vertices of an equilateral triangle. This embodiment, therefore, illustrates the simplest situation in which the processes of the invention can be practiced. Proper codes under the invention are shown in Table I.

TABLE 1

| | Conductor | | |
|---|---|---|---|
| | A | B | C |
| Code No.: | | | |
| 1 | + | − | ---- |
| 2 | − | + | ---- |
| 3 | + | ------ | − |
| 4 | − | ------ | + |
| 5 | ------ | + | − |
| 6 | ------ | − | + |

There are six possible codes, each of which consists of a pair of electrical pulses of equal duration having the indicated polarities. Since each of these conductor-pairs is symmetrical with respect to the remaining unused conductor, cross-talk is avoided for the reasons already given.

Figure 3:
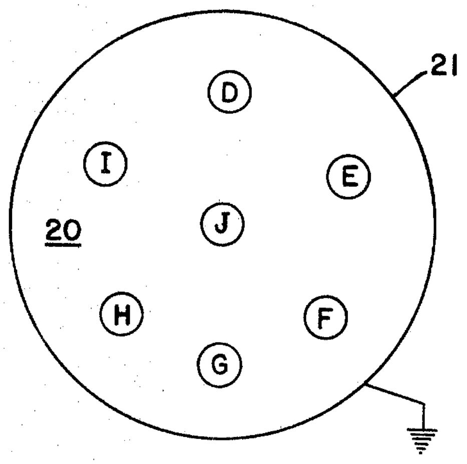
FIG. 3 is a cross-sectional representation of a seven-conductor borehole cable.

Now, considering FIG. 3, logging cable 20 has seven conductors contained within grounded sheath 21. Conductors D, E, F, G, H, and I are positioned respectively at the vertices of a regular hexagon and conductor J is located at the center of the hexagon.

First, assume that conductors D, F, H, and J are telemetric conductors over which digital signals may be encoded and transmitted to the surface and conductors E, G, and I are exclusively utilized for nontelemetric purposes. In effect, then, cable 21 can be treated as a four-conductor cable and coded as set forth in Table II.

TABLE II

| | Conductor | | | |
|---|---|---|---|---|
| | D | F | H | J |
| Code No.: | | | | |
| 1 | + | − | ---- | ---- |
| 2 | − | + | ---- | ---- |
| 3 | + | ---- | − | ---- |
| 4 | − | ---- | + | ---- |
| 5 | ---- | + | − | ---- |
| 6 | ---- | − | + | ---- |

Again, there are six permissive codes. Each code is comprised of a pair of positive and negative pulses applied to the designated conductors and the conductors of each conductor-pair are symmetrical with respect to each of the remaining two unused conductors.

It will be seen that conductor J cannot be suitably paired with any of conductors D, F, or H; this explains why the number of codes is the same as in the previous example.[1]

Second, assume that conductors D, E, F, G, H, and I are telemetric conductors while conductor J is used for some purpose other than telemetry. Table III lists the permissive codes.

TABLE III

| | Conductor | | | | | |
|---|---|---|---|---|---|---|
| | D | E | F | G | H | I |
| Code No.: | | | | | | |
| 1 | + | + | ---- | − | − | ---- |
| 2 | − | − | | + | + | ---- |
| 3 | ---- | + | + | ---- | − | − |
| 4 | ---- | − | − | ---- | + | + |
| 5 | − | ---- | + | + | ---- | − |
| 6 | + | ---- | − | − | ---- | + |
| 7 | + | − | ---- | + | − | ---- |
| 8 | − | + | ---- | − | + | ---- |
| 9 | ---- | + | − | ---- | + | − |
| 10 | ---- | − | + | ---- | − | + |
| 11 | − | ---- | + | − | ---- | + |
| 12 | + | ---- | − | + | ---- | − |

There are twelve code combinations according to the principles of the present invention. It should be observed that no single conductor-pair possesses the required symmetry. Therefore, each code is comprised of two pairs of positive and negative pulses applied to the indicated conductors. Each pair of pulse-carrying conductors is, of course, symmetrical with respect to the two remaining unpaired conductors.

Also, it should be observed that each individual active conductor is subjected to identical forces by the other active conductors, i.e. cross-talk occurs to the same extent on all the active conductors. Where some cross-talk takes place, it is preferred that its effects be the same on all the active conductors since this lessens the possibility of misinterpretation.

[1] Conductor J may still be used as a communication channel according to some second coding systems. For instance, conductors D, F, H, and J could all be used to carry code pulses without significant danger of cross-talk since there would be no unused conductors.

Third, assume that conductors D, E, F, G, H, I, and J are all telemetric conductors. Table IV lists the permissive codes.

TABLE IV

| | Conductor | | | | | | |
|---|---|---|---|---|---|---|---|
| | D | E | F | G | H | I | J |
| Code No.: | | | | | | | |
| 1 | + | + | ---- | − | − | ---- | ---- |
| 2 | − | − | ---- | + | + | ---- | ---- |
| 3 | ---- | + | + | ---- | − | − | ---- |
| 4 | ---- | − | − | ---- | + | + | ---- |
| 5 | − | ---- | + | + | ---- | − | ---- |
| 6 | + | ---- | − | − | ---- | + | ---- |
| 7 | + | − | ---- | + | − | ---- | ---- |
| 8 | − | + | ---- | − | + | ---- | ---- |
| 9 | ---- | + | − | ---- | + | − | ---- |
| 10 | ---- | − | + | ---- | − | + | ---- |
| 11 | − | ---- | + | − | ---- | + | ---- |
| 12 | + | ---- | − | + | ---- | − | ---- |
| 13 | + | + | + | − | − | − | ---- |
| 14 | − | − | − | + | + | + | ---- |
| 15 | − | + | + | + | − | − | ---- |
| 16 | + | − | − | − | + | + | ---- |
| 17 | − | − | + | + | + | − | ---- |
| 18 | + | + | − | − | − | + | ---- |
| 19 | + | − | + | − | + | − | ---- |
| 20 | − | + | − | + | − | + | ---- |

Thus, by adding central conductor J the number of codes has been increased from 12 to 20. This increase takes place, even though conductor J is never used as one of the conductor-pairs, because there are more possible pairings of the surrounding conductors. Preferably, codes 1 through 12 are chosen over codes 13 through 20 because each of the used conductors is subjected to identical influences as already noted.

The greater the number of telemetric conductors, usually the greater the number of code possibilities; however, downhole equipment becomes more complex as code pulses are applied to increasing numbers of conductors. Consequently, it is preferred that only the minimum number of conductors necessary to provide the needed number of codes be used. This goal can probably best be obtained by using other coding procedures in conjunction with the telemetering system herein proposed.

While specific embodiments of the invention have been presented as required by the rules of practice, it is intended that the scope of the invention be limited only by the appended claims after due allowance for equivalents.

What is claimed is:

1. A process for telemetering logging data up a borehole cable having at least three telemetric conductors under conditions whereby cross-talk is minimized comprising:

(a) transposing said data into digital signals, (b) selecting pairs of less than all of said conductors such that the individual members of each of said pairs are symmetrical with respect to each of the remaining unpaired conductors, (c) encoding at least some of said signals according to a predetermined program whereby positive and negative pulses of equal duration are applied to separate members of at least one of said pairs of conductors, (d) synchronously transmitting said pulses for each of said encoded signals to the surface, and (e) decoding said pulses according to said program to reproduce said encoded signals.

2. A process as set forth in claim 1 in which up to six digital signals are encoded in step (b) where there are three telemetric conductors positioned respectively at the vertices of an equilateral triangle.

3. A process as set forth in claim 1 in which up to 12 digital signals are encoded in step (b) where there are six telemetric conductors positioned respectively at the vertices of a regular hexagon.

4. A process as set forth in claim 1 in which up to 20 digital signals are encoded in step (b) where there are seven telemetric conductors such that six are positioned respectively at the vertices of a regular hexagon and the seventh is located at the center thereof.

5. A process as set forth in claim 1 in which digital signals which have the same significance in that they may be interpreted to have the same geological meaning are combined downhole so that fewer channels will be needed for transmission purposes.

References Cited

UNITED STATES PATENTS 3,090,940 5/1963 Vogel.

RODNEY D. BENNETT, Jr., Primary Examiner

D. C. KAUFMAN, Assistant Examiner